(12) United States Patent
Rodrigues et al.

(10) Patent No.: US 10,756,966 B2
(45) Date of Patent: Aug. 25, 2020

(54) CONTAINERIZED SOFTWARE ARCHITECTURE FOR CONFIGURATION MANAGEMENT ON NETWORK DEVICES

(71) Applicant: Cisco Technology, Inc., San Jose, CA (US)

(72) Inventors: Aniket Rodrigues, Fremont, CA (US); Vijaya Laxmi, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 261 days.

(21) Appl. No.: 15/439,361

(22) Filed: Feb. 22, 2017

(65) Prior Publication Data
US 2018/0241627 A1    Aug. 23, 2018

(51) Int. Cl.
*H04L 12/24* (2006.01)
*H04L 12/26* (2006.01)

(52) U.S. Cl.
CPC .......... *H04L 41/0813* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 7,289,434 B2 | 10/2007 | Fedorkow et al. | |
| 9,038,151 B1* | 5/2015 | Chua | H04L 45/02 709/223 |
| 9,294,351 B2 | 3/2016 | Mittal et al. | |
| 9,843,624 B1* | 12/2017 | Taaghol | H04L 67/10 |
| 2011/0134931 A1 | 6/2011 | Merwe et al. | |
| 2013/0132545 A1* | 5/2013 | Schultze | H04L 41/00 709/223 |

(Continued)

FOREIGN PATENT DOCUMENTS

WO    2016155816 A1    10/2016

OTHER PUBLICATIONS

"We run everything on one subnet. I'm a bad person.", Reddit website, Sep. 18, 2015 [retrieved on Sep. 29, 2019]. Retrieved from the Internet: <URL: https://old.reddit.com/r/sysadmin/comments/3lajjl/we_run_everything_on_one_subnet_im_a_bad_person/>. (Year: 2015).*

(Continued)

*Primary Examiner* — Kevin T Bates
*Assistant Examiner* — Dae Kim
(74) *Attorney, Agent, or Firm* — Edell, Shapiro & Finnan, LLC (57) ABSTRACT

A network device has a processor that executes software instructions for a primary control plane operable to program a primary data plane that processes packets received at the network device to determine how or whether the packets are to be directed into a network. The processor also executes software instructions for a secondary control plane operable to program a secondary data plane. The secondary control and data planes are software containerized versions of the primary control and data planes, respectively. One or more configuration changes to be made to the network device are received at the secondary control plane. Test packets are obtained from the primary data plane, and network processing decisions are executed by the secondary data plane on the test packets based on the one or more configuration changes. Results of the network processing decisions executed by the secondary data plane on the test packets are evaluated.

20 Claims, 6 Drawing Sheets

(56) References Cited

U.S. PATENT DOCUMENTS

| | | | |
|---|---|---|---|
| 2016/0057061 A1* | 2/2016 | Avci | H04L 47/125 370/235 |
| 2016/0080415 A1* | 3/2016 | Wu | H04L 63/1491 726/23 |
| 2016/0212012 A1 | 7/2016 | Young et al. | |
| 2016/0226959 A1 | 8/2016 | Zhang et al. | |
| 2016/0344599 A1* | 11/2016 | Porter | H04L 47/283 |

* cited by examiner

CONTAINERIZED SOFTWARE ARCHITECTURE FOR CONFIGURATION MANAGEMENT ON NETWORK DEVICES

TECHNICAL FIELD

The present disclosure relates to managing one or more configuration changes to network devices.

BACKGROUND

A network includes a plurality of interconnected network devices. Network devices frequently require configuration changes to remain optimally functional within the network. Automation technologies can enable the deployment of configuration changes to large numbers of network devices in a network at once.

DESCRIPTION OF EXAMPLE EMBODIMENTS

Overview

Briefly, a network device has a processor that executes software instructions for a primary control plane operable to program a primary data plane that processes packets received at the network device to determine how or whether the packets are to be directed into a network. The processor also executes software instructions for a secondary control plane operable to program a secondary data plane. The secondary control plane is a software containerized version of the primary control plane, and the secondary data plane is a software containerized version of the primary data plane. One or more configuration changes to be made to the network device are received at the secondary control plane. Test packets are obtained from the primary data plane, and network processing decisions are executed by the secondary data plane on the test packets based on the one or more configuration changes. Results of the network processing decisions executed by the secondary data plane on the test packets are evaluated.

Example Embodiments

Figure 1:
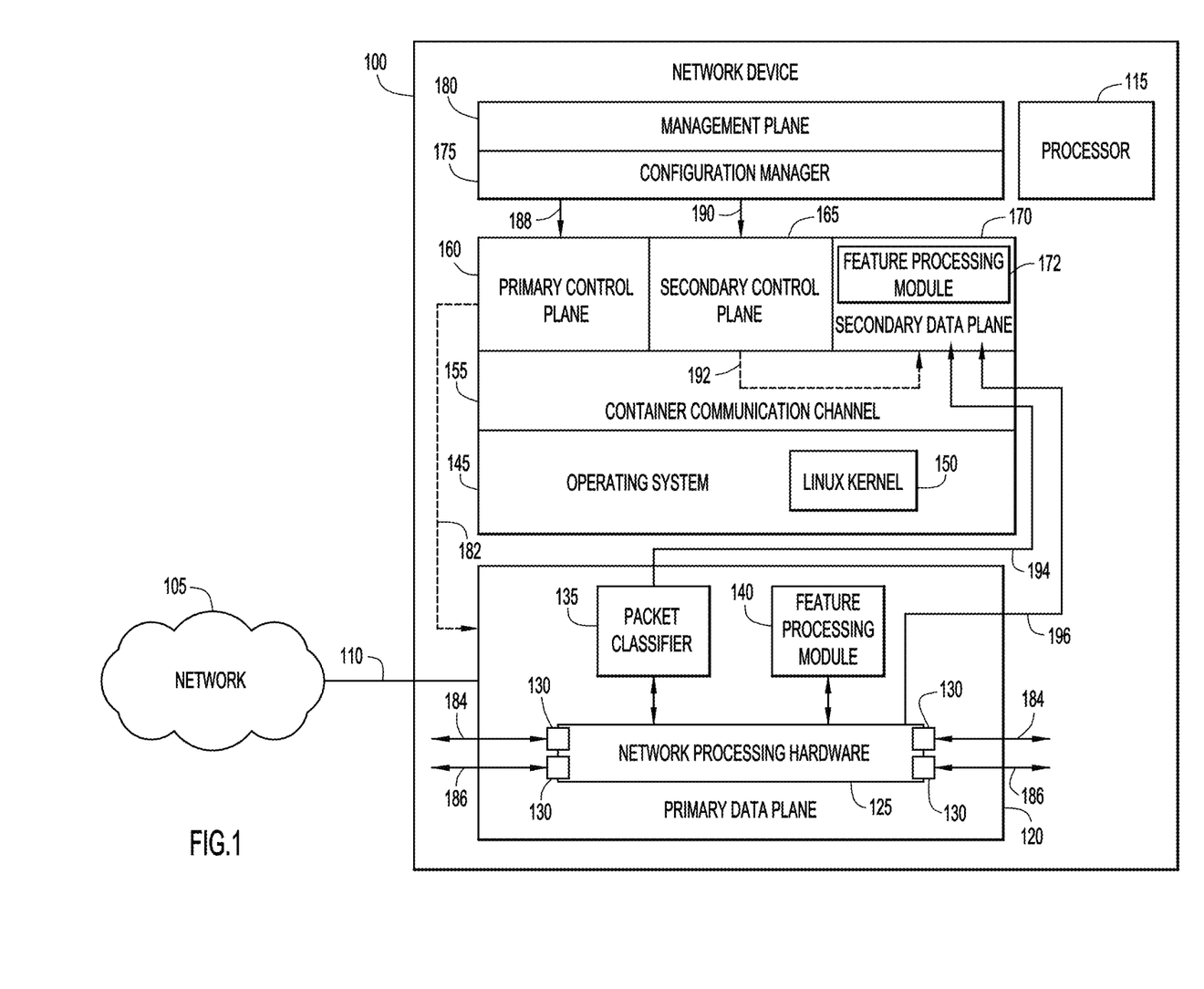
FIG. 1 is a block diagram of a network device configured to manage configuration changes, according to an example embodiment.

With reference made to FIG. 1, a block diagram is illustrated of a network device 100 connected to a network 105 via connection 110. The network device 100 includes a processor 115 to execute software instructions in accordance with the examples provided herein. The network device 100 also includes a primary data plane 120 having network processing hardware 125. The network processing hardware 125 includes network ports 130. The primary data plane 120 also includes software modules, such as packet classifier 135 and feature processing module 140. Operating system 145, including a kernel 150 (such as a Linux® kernel), and container communication channel/path 155 are also hosted on the network device 100. In addition, as explained in greater detail herein, the network device 100 includes primary control plane 160, secondary control plane 165, and secondary data plane 170, which includes feature processing module 172. Configuration manager 175 and management plane 180 are also included at the network device 100.

The network device 100 may be a physical or virtual device, and is operable to, among other functions, switch, route or forward data packets to other network devices in the network 105 or perform network security functions, such as firewall functions.

As described herein, the network device 100 allows the network administrator to evaluate the impact of a configuration change on the network device 100 before applying the configuration change to the network device. In this example, a network administrator (e.g., a network operations engineer, network support engineer, etc.) wishes to change one or more configurations of the network device 100. For instance, the network administrator may wish to apply one or more configuration changes to the network device 100 as well as a large number of other network devices in the network 105. Examples of configuration changes include adding a new permit/deny rule in an access control list, modifying a quality of service policy on a network interface, adding or removing a network route statement, adding a new virtual local area network to a switch, etc. A configuration change may include adding a new configuration, modifying an existing configuration, and/or removing an existing configuration. If the network administrator configures the network device 100 inappropriately, the network device 100 may function sub-optimally within the network 105 after the configuration changes are made. Further, inappropriate configuration of the other network devices simultaneous with the network device 100 (e.g., via an automation technology) can have an immediate negative impact on the network 105 as a whole.

The management plane 180 enables the network administrator to perform configuration and monitoring tasks on the network device 100. The network administrator may access the network device 100 via, for example, console access to the device, secure shell (SSH) or telnet access to a command line interface (e.g., a device specific command line interface), application program interface (API) access to a representational state transfer (REST) interface, a management graphical user interface (GUI), Hypertext Transport Protocol (HTTP) or HTTP secure (HTTPS) access to a graphical interface, programmatic access to the device via plugins, external scripts executed via SSH/telnet or GUI, etc.

The primary control plane 160 includes a collection of processes and components within a network device operating system. The primary control plane 160 allows the network device 100 to handle key control operations (e.g., enabling and configuring features, participating in dynamic routing relationships, maintaining routing tables, communicating with external services, etc.). The primary control plane 160 is operable to program the primary data plane 120 to apply specific operations on incoming and outgoing data packets, as shown by arrow 182.

As described above, the primary data plane 120 includes physical or virtual hardware, such as network ports (interfaces) 130, that enables processing (switching, routing, forwarding, performing network security functions, etc.) of data packets. In an example, network ports 130 are physical ports that have addresses. The primary data plane 120 may also include, for example, application-specific integrated circuits (ASICs), encryption processors, packet buffers, and ternary content-addressable memory (TCAM). The primary data plane 120 may include network processing hardware 125 (e.g., switch fabric) configured to receive/transmit/forward data traffic via the network ports 130. The network processing hardware 125 may enable network device 100 to communicate with other network devices (i.e., receive data packets destined for network device 100 and/or send data packets originating from network device 100), as shown by arrows 184. The network processing hardware 125 may also process transit data traffic through the primary data plane 120, as shown by arrows 186.

The secondary control plane 165 is a software containerized version (e.g., having duplicate configurations) of the primary control plane 160, and the secondary data plane 170 is a software containerized version (e.g., having duplicate configurations) of the primary data plane 120. In this example, the secondary control plane 165 and a secondary data plane 170 are implemented as Linux software containers. The secondary subsystem (i.e., secondary control plane 165 and secondary data plane 170) is located on the network device 100, but is isolated from the primary subsystem (i.e., primary control plane 160 and primary data plane 120) using system-level virtualization methods. The secondary control plane 165 and secondary data plane 170 operate on top of operating system 145 and Linux™ kernel 150 (as well as system libraries) along with the primary control plane 160, while maintaining an individual memory, central processing unit (CPU), input/output (I/O) and network components. Secondary control plane 165 and secondary data plane 170 provide a lightweight environment with similar capabilities as full-fledged virtual machines. Thus, the secondary subsystem of network device 100 is a software containerized version (e.g., duplicate) of the primary subsystem of device 100.

When the network device 100 boots up, a configuration manager 175 initially configures the primary control plane 160, as shown by arrow 188, and the secondary control plane 165, as shown by arrow 190, based on the startup configuration of the network device 100. As a result, features that are enabled (e.g., by default or due to the device configuration) programmatically interact with the primary control plane 160 (arrow 188), and with the secondary control plane 165 (arrow 190). The primary control plane 160 and secondary control plane 165 may have identical initial configurations. When a configuration change is made to a currently running/operating configuration of the primary control plane 160, the configuration manager 175 ensures that this change is synchronized with the currently running/operating configuration of the secondary control plane 165. Thus, configuration changes associated with the network interfaces of the primary data plane 120 are inherited by corresponding virtual network interfaces associated with the secondary data plane 170. The relevant configuration changes are pushed from the secondary control plane 165 to the secondary data plane 170.

As described above, the primary control plane 160 programs the primary data plane 120 (e.g., the forwarding flows of the primary data plane, including for example ingress and egress features) based on the initial configuration, as shown by arrow 182. Similarly, the secondary control plane 165 programs the secondary data plane 170 (e.g., the forwarding flows of the secondary data plane including for example ingress and egress features) based on the initial configuration, as shown by arrow 192. The secondary control plane 165 and secondary data plane 170 communicate with each other via a container communication channel 155. In this example, the container communication channel 155 provides internal bridge interfaces that are shared by the secondary control plane 165, the secondary data plane 170, and the control host. Certain messages (e.g., control, keep-alive, sync, programmatic function calls, etc.), network control, and data traffic originating from or destined for the secondary data plane 170, as well as data traffic that is copied for evaluation (described in greater detail below) use the container communication channel 155 (e.g., for communication and flow installation). In an example, the primary data plane 120 may forward data packets, via the network processing hardware 125, to the secondary data plane 170 to enable communication between other network devices and the secondary data plane 170, as shown by arrow 196.

In an example, a consistency checker (not shown) ensures that the secondary control plane 165 is properly synchronized with the primary control plane 160, and that the secondary data plane 170 is properly synchronized with the primary data plane 120.

As described above, the network administrator may wish to apply one or more configuration changes to the network device 100. Configuration changes may be made via the management plane 180 using a variety of methods including, for example: device-specific command-line interface (CLI) syntax, software development/information technology operations (DevOps) tools, simple network management protocol (SNMP)-based management tools, Linux scripting tools, and graphic user interface (GUI)-based management interfaces.

Instead of immediately applying the configuration changes to the primary subsystem, the network administrator may first evaluate the potential impact of the configuration changes on the primary subsystem by applying the changes to the secondary subsystem. To permit this, the network device 100 enters "evaluation mode." In an example, the network administrator may enable evaluation mode by adjusting a software knob provided by the primary subsystem via configuration manager 175. While evaluation mode is active, configuration changes are applied to the secondary control plane 165, but not to the primary control plane 160.

The secondary data plane 170 makes forwarding decisions on test packets. A packet classifier 135 running in the primary data plane 120 may be configured by the network administrator to selectively copy a limited number of data packets to be used as test packets, as shown by arrow 194. Thus, the packet classifier 135 may obtain test packets by selectively copying data packets routed through the primary data plane 120. Configuration of the packet classifier 135 involves adding to network device 100 a new access list that is used to identify data packets that the administrator intends to have copied. An extended access list may match the five-tuple of an IPv4 or IPv6 data packet. Similarly, a layer 2 access list may be used to identify fields in an Ethernet header, such that multiple layer 2 protocol parameters may be copied and evaluated. Below are example command line statements to configure packet classifier 135.

hostname(config)# access-list classify permit tcp host 192.168.1.10 host 192.168.2.10 eq 443
hostname(config)# classifier-policy permit 10
hostname(config-classifier)# match access-list classify A packet classifier 135 maintains a mapping between the network interfaces 130 on the network device 100 (e.g., on the primary data plane 120) and the virtual interfaces associated with the secondary data plane 170. This mapping is used to perform a lookup of the virtual interface(s) corresponding to the network interface(s) (e.g., ingress interface(s)) associated with the test packets. When a data packet has parameters (e.g., 5-tuple) that matches the access list, a copy of the data packet (i.e., the test packet) is forwarded (arrow 194) to the corresponding virtual interface of the secondary data plane 170. The test packet ingresses a virtual interface of the secondary data plane 170 and is subject to ingress and egress features (e.g., network processing decisions) based on the one or more configuration changes made by the network administrator in the evaluation mode.

Once the secondary data plane 170 has executed network processing decisions on the test packet(s), the feature processing module 172 in the secondary data plane 170 records the forwarding decisions. For example, the feature processing module 172 may record a trace of the forwarding decisions by each ingress and egress feature. The feature processing module 172 also records whether a feature intended to drop, punt or consume a data packet. All test packets that were marked to egress the network device 100 may be implicitly dropped in order to prevent duplicate packets from being injected into the network 105. Thus, test packets may be dropped after the secondary data plane 170 executes the network processing decisions.

After the network processing decisions of the secondary data plane 170 are evaluated and verified, the network administrator may determine whether to apply the one or more configuration changes to the primary data plane 120 based on the results of the network processing decisions on the test packets by the secondary data plane 170. In particular, the network administrator may determine whether to apply all, some, or none of the one or more configuration changes to the primary data plane 120 based on the results of the network processing decisions on the test packets. In an example, a network administrator configures an access list to drop certain traffic. If the evaluation results from the secondary subsystem indicate that the traffic is allowed, the network administrator may choose not to apply that configuration to the primary subsystem, and instead may further modify the configuration in evaluation mode to ensure the desired result is produced (i.e., that the packets are dropped). If the evaluation mode continues to show a permit in the results, the network administrator may test other/additional configurations to determine the cause of this effect, contact the device vendor to investigate possible software bugs in the code, or perform one or more other service/support actions.

The network administrator may apply to the primary subsystem a copy of the configuration changes that were held in an evaluation buffer. If the network administrator decides not to apply any configuration changes to the primary data plane 120, the current running/operating configuration of the primary subsystem remains unaffected (i.e., unchanged). Configuration synchronization between the primary control plane 160 and the secondary control plane 165 continues regardless of whether evaluation mode is enabled. Thus, configuration settings of the secondary control plane 165 may be synchronized to configuration settings of the primary control plane 160 before the one or more configuration changes to be tested by the secondary data plane 170 are received by the secondary control plane 165. In other words, the configuration of the primary subsystem may be initially applied to the secondary subsystem such that the initial configuration of the secondary subsystem matches that of the primary subsystem. In an example, synchronization in the other direction (i.e., applying the configuration of the secondary subsystem to the primary subsystem) is prohibited. Direct changes to the primary subsystem are applied based on the existing configuration commit design.

The network device 100 may optionally include a lightweight packet generation module (not shown) to generate test packets for configurable source and destination Internet Protocol (IP) ranges. Also, an optional predetermined limit on the number of replicated (copied) packets may prevent overload of the device with excessive replicated traffic.

The following examples demonstrate how stored evaluation results may be displayed for the network administrator. The first example illustrates evaluation results where network device 100 is a firewall device, and the second example illustrates evaluation results where network device 100 is a layer 3 gateway (e.g., router, switch, etc.).

Example 1: Firewall Device

Packet details:

| Source IP | Source Port | Destination IP | Destination Port | IP Identity | Type of Service (ToS) bits | VLAN Tag | Transport protocol |
| --- | --- | --- | --- | --- | --- | --- | --- |
| 1.1.1.1 | 50001 | 2.2.2.2 | 80 | 0x74ea | 0000 0000 | None | TCP (6) |

Packet Processing Flow:
Feature: Access-list Inbound
Matched rule:
access-list internet_access permit tcp 192.168.1.0 255.255.255.0 any eq http
Action/Result: Permit
Feature: Network Address Translation (NAT)
Matched rule:
nat (inside, outside) source dynamic any interface
Action/Result:
Real Source IP/port: 192.168.1.1/20001
Translated Source IP/port: 1.1.1.1/50001
Real Destination IP/port: 2.2.2.2/80
Translated Destination IP/port: 2.2.2.2/80
Feature: Egress Routing
Matched rule:
route outside 0.0.0.0 0.0.0.0 1.1.1.10 1
Action/Result: Forward
Feature: L2 Adjacency
Matched rule:
Next hop IP address: 1.1.1.10
Next hop MAC address: AA:AB:11:11:DE:CB Action: Forward Example 2: Layer 3 Gateway Packet details:

| Source IP | Source Port | Destination IP | Destination Port | IP Identity | ToS bits | VLAN Tag | Transport protocol |
|---|---|---|---|---|---|---|---|
| 10.1.1.1 | 3450 | 20.1.1.1 | 5679 | 0x70e1 | 00101000 | None | UDP (17) |

Packet Processing Flow:
Feature: Access-list Inbound
Matched rule:
access-list voip_traffic permit udp 10.1.1.0 0.0.0.255 20.1.1.0 0.0.0.255
Action/Result: Permit
Feature: NAT
Matched rule:
none
Action/Result:
Real Source IP/port: 10.1.1.1/3450
Translated Source IP/port: 10.1.1.1/3450
Real Destination IP/port: 20.1.1.1/5679
Translated Destination IP/port: 20.1.1.1/5679
Feature: Outbound QoS
Matched policy:
Outbound_VoIP_policy
Action/Result: set dscp af11
Feature: Egress Routing
Matched rule:
ip route 20.1.1.0 255.255.255.0 192.168.100.1 1
Action/Result: Forward
Feature: L2 Adjacency
Matched rule:
Next hop IP address: 192.168.100.1
Next hop MAC address: unknown
Action/Result: Drop In general, the displayed features and associated actions depend on the order of operations of the enabled feature components. For example, if a packet is dropped by a feature, it may not be evaluated against the remaining features in the list. Punt and consume may be additional actions in addition to a forward, permit, and drop.

Figure 2:
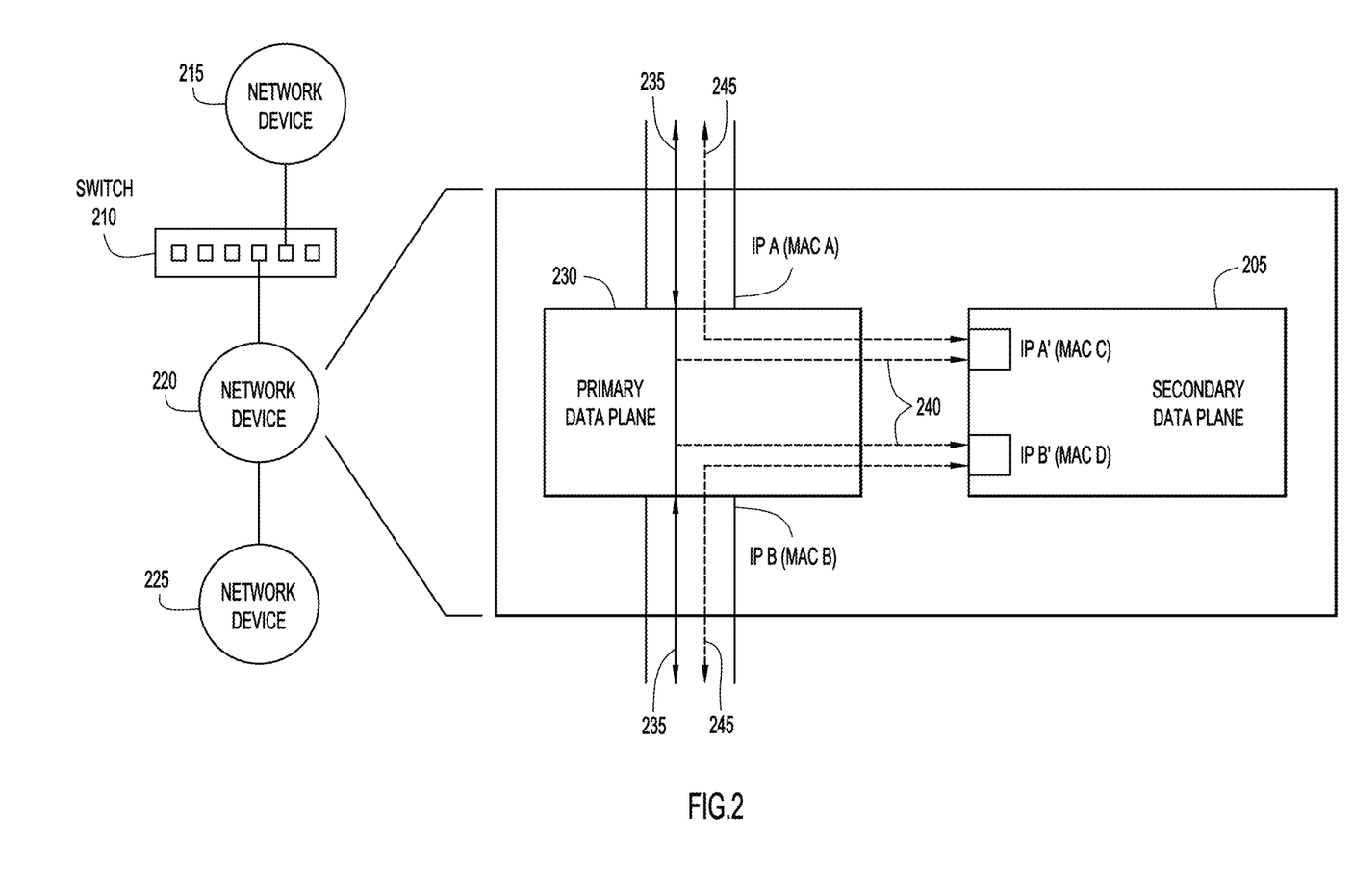
FIG. 2 is a diagram illustrating a data packet flow in a network device in which configuration changes are evaluated, according to an example embodiment.

With reference now to FIG. 2, a diagram illustrating data packet flow to and from a secondary data plane 205 is described in accordance with examples presented herein. FIG. 2 illustrates a switch 210 operable to communicate with network device 215 and network device 220. Network device 220 is also operable to communicate with network device 225.

The network device 220 includes the secondary data plane 205 and a primary data plane 230. The secondary data plane 205 and a primary data plane 230 are similar to the secondary data plane 170 and a primary data plane 120 as described above in connection with FIG. 1. For example, the secondary data plane 205 is a software containerized version (e.g., having duplicate configurations) of the primary data plane 230. The primary data plane 230 is operable to receive/transmit/forward data packets, as shown by arrows 235. During evaluation mode, test packets may be copied from the data packets and transmitted to the secondary data plane 205, as shown by arrows 240. The secondary data plane 205 is also operable to communicate with, for example, network devices 215, 225 via the primary data plane 230, as shown by arrows 245.

The configuration of the secondary data plane 205 is synchronized with that of the primary data plane 230 to ensure accurate evaluations of configuration changes in the evaluation mode. Thus, in general, the secondary data plane 205 duplicates the configurations of the primary data plane 230. However, exceptions to this are IP and Media Access Control (MAC) addresses assigned to the network interfaces of the primary data plane 230. These same IP and MAC addresses cannot also be assigned to the virtual interfaces of the secondary data plane 205, or duplicate addressing will result. For example, duplicate addressing may cause data packets intended for the primary data plane 230 (e.g., arrow 235) to be routed to the secondary data plane 205, and may cause data packets intended for the secondary data plane 205 (e.g., arrows 245) to be routed to the primary data plane 230.

In this example, a first network interface of the primary data plane 230 is assigned IP address A and MAC address A, and a second network interface of the primary data plane 230 is assigned IP address B and MAC address B. If a virtual interface of the secondary data plane 205 was also assigned IP address A or B, or MAC address A or B, this would cause duplicate addressing. To prevent duplicate addressing with respect to the MAC addresses, the virtual interfaces in the secondary data plane 205 are automatically assigned unique MAC addresses. Specifically, a first virtual interface in the secondary data plane 205 is assigned MAC address C, and a second virtual interface in the secondary data plane 205 is assigned MAC address D.

The secondary subsystem (including secondary data plane 205) prevents the network administrator from assigning an IP address to any of the virtual interfaces in the secondary data plane 205 if that IP address is already assigned to any of the network interfaces of the primary data plane 230. In this example, the secondary subsystem prevents the network administrator from assigning to any of the virtual interfaces in the secondary data plane 205, IP address A or IP address B, because IP addresses A and B are already assigned to the network interfaces of the primary data plane 230.

As such, assignment of IP addresses on the virtual interfaces may be utilized to prevent duplicate addressing. In this example, the network administrator assigns to a virtual interface of the secondary data plane 205 an IP address that has the same subnet as the IP address of the corresponding network interface of the primary data plane 230. Assigning the same subnet avoids the need to configure the rest of the network devices for a new IP subnet that would be used on the virtual interfaces because the network devices are already configured for the subnets of IP addresses A and B. If an IP address in the same subnet is not used, the network administrator may need to make a change to the static or dynamic routing protocol(s) configured in the network.

In this example, IP address A' is assigned to a first virtual interface of the secondary data plane 205. IP address A' has the same subnet as IP address A, which is the IP address of the first network interface of the primary data plane 230. Similarly, IP address B' is assigned to a second virtual interface of the secondary data plane 205. IP address B' has the same subnet as IP address B, which is the IP address of the second network interface of the primary data plane 230. Thus, each virtual interface of the secondary data plane 205 is assigned an IP address that differs from every IP address assigned to a network interface of the primary data plane 230.

The network administrator may assign to a virtual interface in the secondary data plane 205 any IP address not already assigned to a network interface of the primary data plane 230. These assigned IP addresses may be referred to as "evaluation IP addresses," and may become active when evaluation mode is enabled.

When a control or data packet is generated by the secondary subsystem (e.g., secondary data plane 205), the packet is sourced using the evaluation IP address (e.g., IP address A') from the corresponding virtual interface. When evaluation mode is enabled, the network interface (e.g., associated with IP address A) on the primary data plane 230 may send a gratuitous address resolution protocol (ARP) or respond to ARP requests on behalf of the corresponding evaluation IP address (e.g., IP address A'). This behavior ensures that any packet destined for an evaluation IP address is received by the primary data plane 230 and internally forwarded to the secondary data plane 205. This mechanism allows the secondary subsystem to form neighbor relationships in dynamic routing protocols, and communicate with external servers running services (e.g., SNMP, remote authentication dial-in user service (RADIUS), terminal access controller access control system (TACACS), TACAS Plus, NetFlow, Syslog, etc.).

Figure 3:
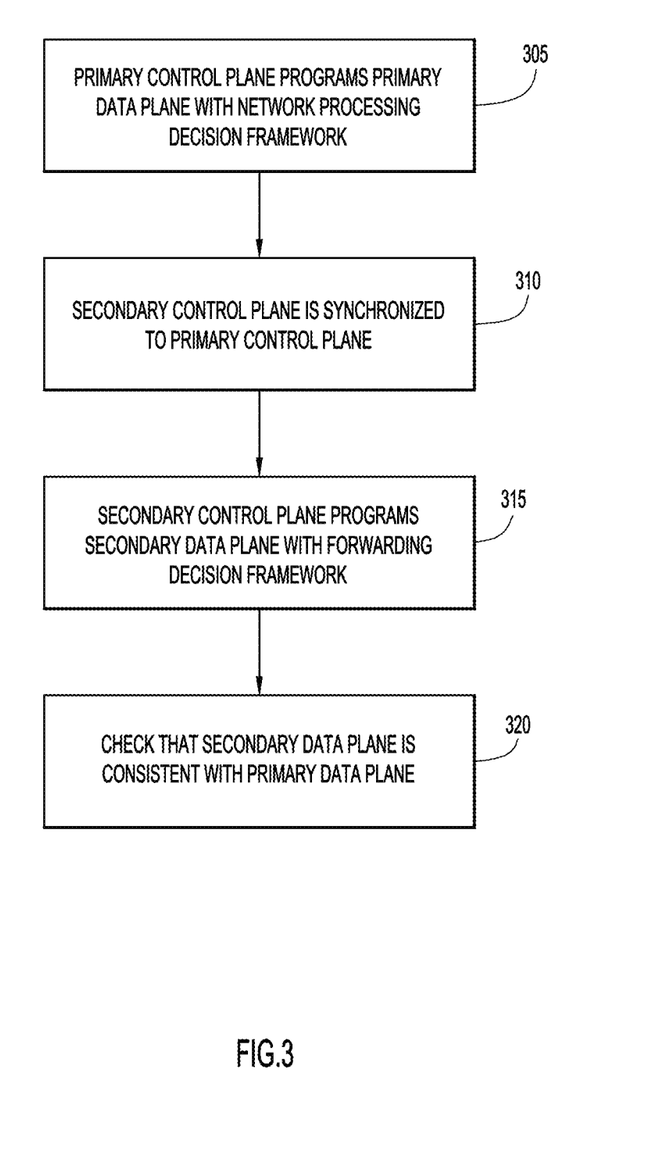
FIG. 3 is a flowchart of a method for synchronizing configurations in a network device before evaluating configuration changes, in accordance with an example embodiment.

FIG. 3 is a flowchart of a method for synchronizing configurations in a network device before evaluating configuration changes in accordance with examples presented herein. The method of FIG. 3 may occur before a network administrator applies configuration changes to a secondary subsystem (e.g., as part of an initial setup). At 305, the primary control plane programs the primary data plane with a network processing decision framework (i.e., the primary control plane pushes a configuration to the primary data plane). At 310, the secondary control plane is synchronized to the primary control plane. For example, the synchronization may ensure that the configuration of the secondary control plane matches the configuration of the primary control plane. At 315, the secondary control plane programs the secondary data plane with the forwarding decision framework (i.e., the secondary control plane pushes the configuration to the secondary data plane). At optional operation 320, a consistency checker verifies that the secondary data plane is consistent with the primary data plane. Generally, operations 305, 310, 315, and 320 may be arranged in any suitable chronological order. For example, in another embodiment, the flowchart of FIG. 3 may proceed as follows: 310, 315, 305, 320.

Figure 4:
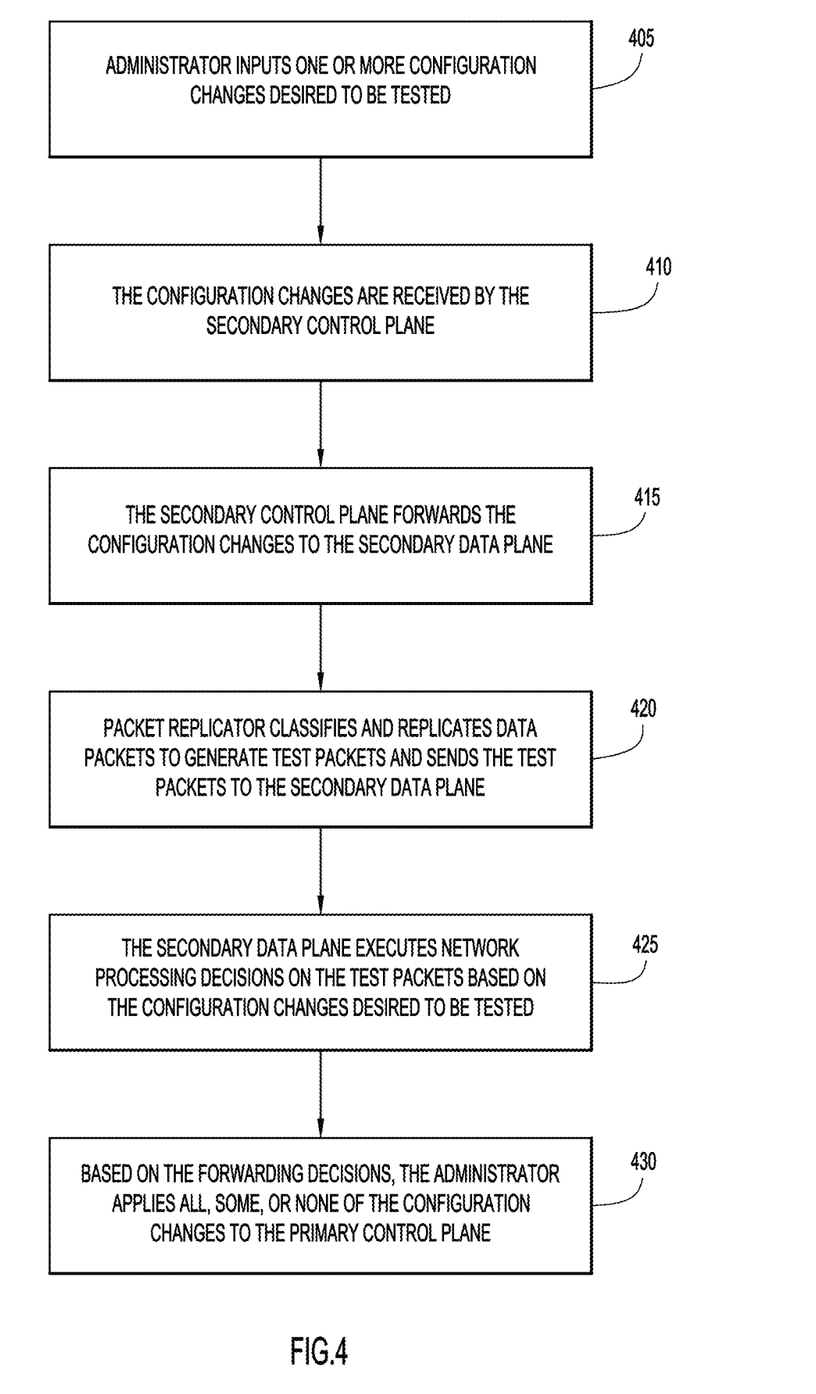
FIG. 4 is a flowchart illustrating overall operational flow for managing configuration changes in a network device in accordance with an example embodiment.

Reference is now made to FIG. 4. FIG. 4 shows a flowchart of an overall operational flow in accordance with examples presented herein. The method of FIG. 4 may enable a network administrator to test/evaluate one or more configuration changes. At 405, the network administrator inputs one or more configuration changes desired to be tested. At 410, the secondary control plane receives the configuration changes. At 415, the secondary control plane forwards the configuration changes to the secondary data plane. At 420, the packet replicator classified and replicates data packets to generate test packets. The packet replication sends the test packets to the secondary data plane. At 425, the secondary data plane executes network processing decisions on the test packets based on the configuration changes desired to be tested. At 430, based on the forwarding decisions, the administrator applies all, some, or none of the configuration changes to the primary control plane, depending on the results generated by the secondary data plane.

Figure 5:
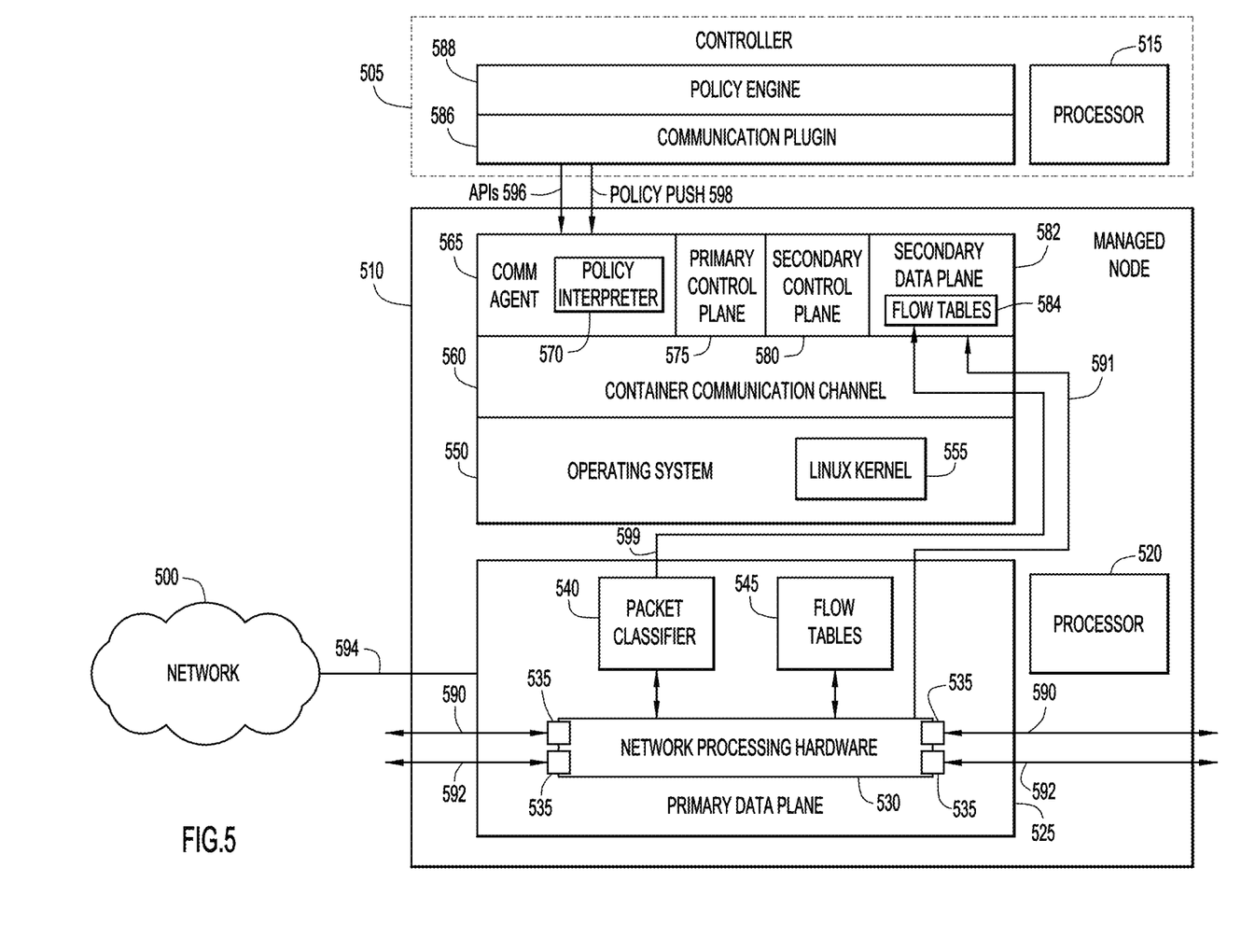
FIG. 5 is a block diagram of an embodiment for managing configuration changes on a network device in software-defined networking environment, according to an example embodiment.

FIG. 5 is a block diagram of a software-defined network environment including a network 500, a controller 505, and a managed node (e.g., network device) 510, according to an example embodiment. There are many aspects of the example of FIG. 5 that are similar to the example of FIG. 1 described above. The controller 505 and managed node 510 include processor 515 and processor 520, respectively. These processors 515, 520 enable the controller 505 and managed node 510 to execute software instruction in accordance with the examples provided herein.

The managed node 510 includes a primary data plane 525 having network processing hardware 530 (e.g., forwarding hardware), which includes network ports 535. The primary data plane 525 also includes software modules, such as packet classifier 540 and flow tables 545. Operating system 550, including Linux kernel 555, and container communication channel 560 are also hosted on the managed node 510. The network device also includes communication agent 565, which in turn includes policy interpreter 570. In addition, as explained in greater detail herein, the managed node 510 includes primary control plane 575, secondary control plane 580, and secondary data plane 582, which has flow tables 584. The controller 505 includes a communication plugin 586 and a policy engine 588.

The secondary control plane 580 is a software containerized version (e.g., having duplicate configurations) of the primary control plane 575, and the secondary data plane 582 is a software containerized version (e.g., having duplicate configurations) of the primary data plane 525. Although in this example the managed node 510 includes the primary control plane 575, the primary data plane 525, the secondary control plane 580, and the secondary data plane 582, other examples may differ in this respect. For example, the managed node may include the primary and secondary data planes, with the primary and secondary control planes located at the controller, which may make policy decisions.

The network processing hardware 530 enables managed node 510 to communicate with other network devices (i.e., receive data packets destined for managed node 510 and/or send data packets originating from managed node 510) via network ports 535, as shown by arrows 590. A communication path may be established between the network processing hardware 530 and the secondary data plane 582, as shown by arrow 591. The network processing hardware 530 may also enable communication between network devices other than managed node 510 (i.e., by pushing transit data traffic through the primary data plane 525), as shown by arrows 592. The network processing hardware 530 thus enables the managed node 510 to connect to the network 500, as shown by connection 594. The forwarding decision framework is maintained in flow tables 545 to enable the network processing hardware 530 to execute its forwarding decisions.

Communication between the controller 505 and managed node 510 is enabled by a communication plugin 586 on the controller 505 and a communication agent 565 on the managed node 510. There are a wide variety of open source and vendor-specific communication protocols and APIs that enable the controller 505 to program configurations to the managed node 510 (e.g., via communication plugin 586). The controller 505 manages, for example, the flow control of the managed node 510 via APIs, as shown by arrow 596. In this example, the controller 505 uses a custom policy tag that provides added functionality to the communication between the controller 505 and the managed node 510. The custom policy tag may be included at the beginning of the policy construct (e.g., when configurations for the secondary subsystem are pushed to the managed node 510).

On the managed node 510, communication agent 565 establishes communication with the controller 505. In this implementation, the communication agent 565 includes a policy interpreter 570, which allows the managed node 510 to distinguish between a primary subsystem policy and secondary subsystem policy based on the custom policy tag. In an example, if evaluation mode is enabled, the policy interpreter 570 configures the secondary control plane 580 with the relevant device-specific policies. The secondary control plane 580 in turn programs forwarding decisions on the secondary data plane 582. Configurations associated with specific network interfaces of the primary data plane 525 are inherited by corresponding virtual interfaces in the secondary data plane 582. In another example, when a secondary subsystem policy is received from controller 505 by managed node 510, the policy interpreter 570 ensures that network processing decisions are programmed directly into the secondary data plane 582 (e.g., via flow tables 584). The policy interpreter 570 also ensures that the secondary subsystem policy does not interact with the primary control plane 575 or primary data plane 525. Once the flow tables 584 are populated in the secondary data plane 582, an administrator has the opportunity to evaluate traffic against the modified policy.

The controller 505 is initially configured with policies (e.g., configurations) for the primary and secondary subsystems, and manages the primary control plane 575 and the secondary control plane 580 via the policy engine 588. The policy engine 588 also handles a variety of functions, including creating a secondary subsystem policy that mirrors a newly created primary subsystem policy. The policy engine 588 synchronizes the secondary subsystem policy with the primary subsystem policy such that changes to the primary subsystem policy are replicated for the secondary subsystem policy. This synchronization may be continuous/regular/periodic and unidirectional (i.e., changes to the primary subsystem policy are replicated for the secondary subsystem policy, but changes to the secondary subsystem policy are not replicated for the primary subsystem policy).

The policy engine 588 also compares the secondary subsystem policy with the primary subsystem policy to prevent the use of duplicate IP address, as described above. The policy engine 588 further checks the primary subsystem policy and the secondary subsystem policy for errors to ensure consistency between the two policies. To prevent changes made to managed node 510 during evaluation mode from impacting other nodes managed by controller 505, the policy engine 588 provides policy isolation for managed node 510. In addition, the policy engine 588 enables configuration changes made to the secondary subsystem during evaluation mode to be applied to the primary subsystem.

The evaluation mode enables a network administrator to make configuration changes to the secondary subsystem and not to the primary subsystem. During evaluation mode, the network administrator may cause these changes to be pushed from the controller 505, via the communication plugin 586, to the secondary control plane 580 and/or the secondary data plane 582, as shown by arrow 598. Whether the changes are pushed to the secondary control plane 580, the secondary data plane 582, or both depends on the particular architecture of the system.

Once the secondary data plane 582 is configured with one or more configuration changes, the packet classifier 540 evaluates the effects of the policy (e.g., configuration) changes. The packet classifier 540 copies data packets that match a classifier policy set by the network administrator. Copied (test) packets are injected to the secondary data plane 582 via the container communication channel 560, as shown by arrow 599. A limit on the number of copied packets may be enforced to prevent oversubscribing the managed node 510. After packet processing in the secondary data plane 582 is complete, the managed node 510 discards the test packets. Results of the packet processing flow may be sent back to the controller 505 for review by the network administrator.

When the secondary data plane 582 needs to communicate with external devices, the secondary data plane 582 sources packets from the evaluation IP addresses and associated virtual interfaces. Also, during evaluation mode, there may be instances in which a test packet needs to be processed by the secondary control plane 580. In this example, the test packet is internally punted to the secondary control plane 580 via the container communication channel 560.

In other examples, a test packet may be forwarded to a controller via a communication agent. Further, if a test packet needs to be forwarded directly to a controller, an additional field in the encapsulation protocol header of the test packet may indicate that the test packet originated from a secondary data plane of the managed node. This information helps the controller perform computations for the managed node in the evaluation space without impacting the primary subsystem policies for other nodes managed by the controller.

Figure 6:
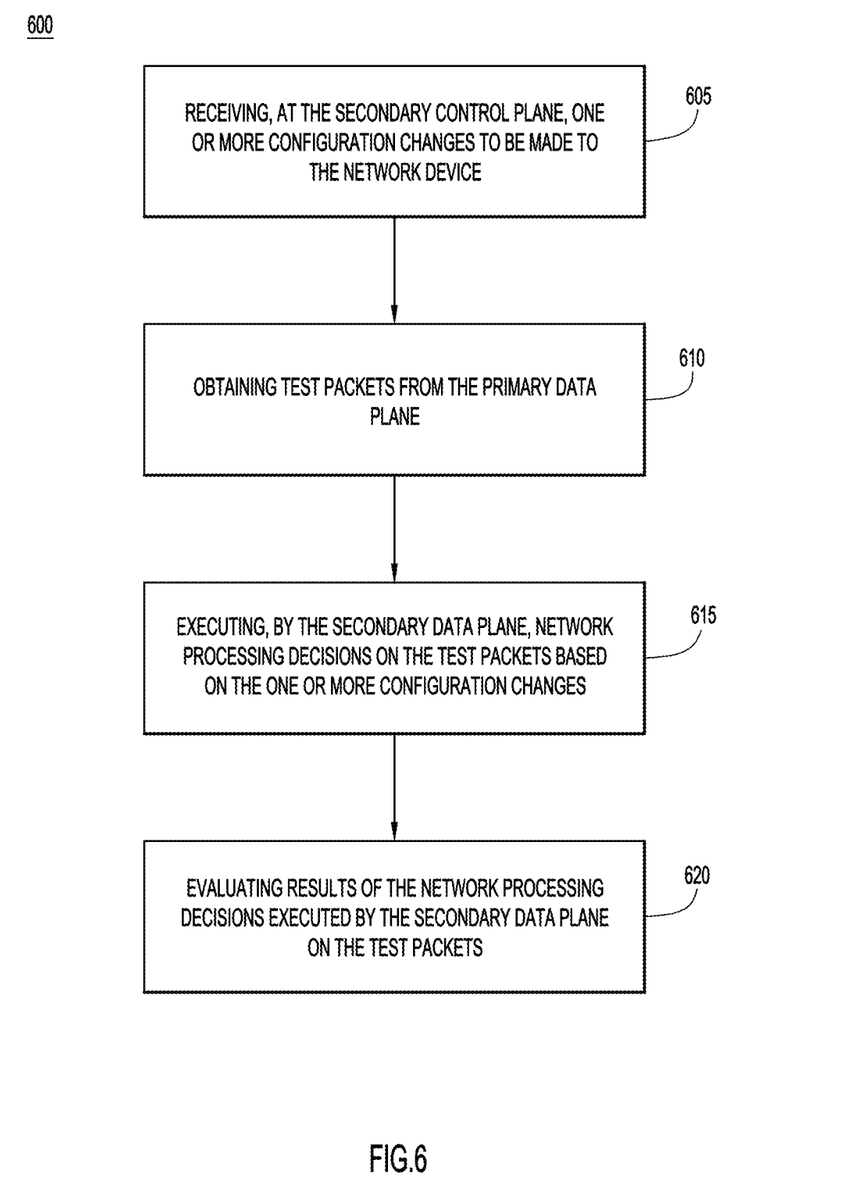
FIG. 6 is a high-level flowchart of a method of managing configuration changes a network device, in accordance with an example embodiment.

FIG. 6 is a flowchart of a method 600 in accordance with examples presented herein. The method 600 is performed in a network device having a processor that executes software instructions for a primary control plane operable to program a primary data plane that processes packets received at the network device to determine how or whether the packets are to be directed into a network, and a secondary control plane operable to program a secondary data plane, wherein the secondary control plane is a software containerized version of the primary control plane, and the secondary data plane is a software containerized version of the primary data plane. At 605, one or more configuration changes to be made to the network device are received at the secondary control plane. At 610, test packets are obtained from the primary data plane. At 615, the secondary data plane executes network processing decisions on the test packets based on the one or more configuration changes. At 620, results of the network processing decisions executed by the secondary data plane on the test packets are evaluated.

This software architecture enables configuration changes to be evaluated on the secondary subsystem before being applied to the primary subsystem. A network administrator may review results of the change as it applies to copied test packets in order to ensure that the configuration change(s) induce the desired behavior (e.g., forwarding decisions). Additionally, the secondary subsystem maintains an incremental configuration which is based on the current running/operating configuration of the primary subsystem. Therefore, configuration validation and risk analysis may be performed without relying on non-production or simulated network environments. This architecture enhances service capabilities to manage customer devices by minimizing downtime and impact on production networks.

In one form, a method is provided. The method comprises: in a network device having a processor that executes software instructions for a primary control plane operable to program a primary data plane that processes packets received at the network device to determine how or whether the packets are to be directed into a network, and a secondary control plane operable to program a secondary data plane, wherein the secondary control plane is a software containerized version of the primary control plane, and the secondary data plane is a software containerized version of the primary data plane: receiving, at the secondary control plane, one or more configuration changes to be made to the network device; obtaining test packets from the primary data plane; executing, by the secondary data plane, network processing decisions on the test packets based on the one or more configuration changes; and evaluating results of the network processing decisions executed by the secondary data plane on the test packets.

In another form, an apparatus is provided. The apparatus comprises: at least one processor; network processing hardware that processes packets to determine how or whether the packets are to be directed into a network on behalf of a network device; and at least one memory that stores instructions for a primary control plane operable to program a primary data plane that includes the network processing hardware, and a secondary control plane operable to program a secondary data plane, wherein the secondary control plane is a software containerized version of the primary control plane, and the secondary data plane is a software containerized version of the primary data plane; wherein the at least one processor is configured to: receive, at the secondary control plane, one or more configuration changes to be made to the network device; obtain test packets from the primary data plane; execute, by the secondary data plane, network processing decisions on the test packets based on the one or more configuration changes; and evaluate results of the network processing decisions executed by the secondary data plane on the test packets.

In another form, one or more non-transitory computer readable storage media are provided. The non-transitory computer readable storage media are encoded with instructions to be executed by a processor in a network device that includes a primary control plane operable to program a primary data plane that processes packets received at the network device to determine how or whether the packets are to be directed into a network, and a secondary control plane operable to program a secondary data plane, wherein the secondary control plane is a software containerized version of the primary control plane, and the secondary data plane is a software containerized version of the primary data plane, wherein the instructions, when executed by a processor, cause the processor to: receive, at the secondary control plane, one or more configuration changes to be made to the network device; obtain test packets from the primary data plane; execute, by the secondary data plane, network processing decisions on the test packets based on the one or more configuration changes; and evaluate results of the network processing decisions executed by the secondary data plane on the test packets.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    in a network device having a processor that executes software instructions for a primary control plane operable to program a primary data plane that processes data packets obtained at the network device to determine how or whether the data packets are to be directed into a network, and a secondary control plane operable to program a secondary data plane, wherein the secondary control plane is a software containerized version of the primary control plane, and the secondary data plane is a software containerized version of the primary data plane, and wherein a first Internet Protocol address assigned to a network interface of the primary data plane differs from a second Internet Protocol address assigned to a virtual interface of the secondary data plane, the first and second Internet Protocol addresses sharing a common subnetwork:
    obtaining, at the secondary control plane, one or more configuration changes to be made to the network device;
    generating test packets by selectively copying the data packets from the primary data plane based on one or more parameters of the data packets matching one or more access lists;
    executing, by the secondary data plane, network processing decisions on the test packets based on the one or more configuration changes;
    intentionally dropping the test packets after executing the network processing decisions by the secondary data plane; and
    evaluating results of the network processing decisions executed by the secondary data plane on the test packets.

2. The method of claim 1, further comprising determining whether to apply all, some, or none of the one or more configuration changes to the primary data plane based on the results of the network processing decisions on the test packets.

3. The method of claim 1, further comprising synchronizing configuration settings of the secondary control plane to configuration settings of the primary control plane before obtaining the one or more configuration changes.

4. The method of claim 1, wherein the network device is a managed network element.

5. The method of claim 1, wherein the primary data plane has a plurality of network interfaces including the network interface at which the data packets may be obtained or provided from the network device and the secondary data plane has a plurality of virtual interfaces including the virtual interface, wherein each virtual interface of the plurality of virtual interfaces is assigned an Internet Protocol address that differs from every Internet Protocol address assigned to the plurality of network interfaces of the primary data plane.

6. The method of claim 1, wherein obtaining the one or more configuration changes includes obtaining the one or more configuration changes from a network controller.

7. The method of claim 1, wherein the one or more parameters correspond to a five-tuple of an Internet Protocol data packet.

8. The method of claim 1, wherein the one or more parameters correspond to one or more fields in an Ethernet header.

9. The method of claim 1, further comprising prohibiting synchronizing configuration settings of the primary control plane to configuration settings of the secondary control plane.

10. An apparatus comprising:
    at least one processor;
    network processing hardware that processes data packets to determine how or whether the data packets are to be directed into a network on behalf of the apparatus; and at least one memory that stores instructions for a primary control plane operable to program a primary data plane that includes the network processing hardware, and a secondary control plane operable to program a secondary data plane, wherein the secondary control plane is a software containerized version of the primary control plane, and the secondary data plane is a software containerized version of the primary data plane, and wherein a first Internet Protocol address assigned to a network interface of the primary data plane differs from a second Internet Protocol address assigned to a virtual interface of the secondary data plane, the first and second Internet Protocol addresses sharing a common subnetwork, wherein the at least one processor is configured to:
  obtain, at the secondary control plane, one or more configuration changes to be made to the apparatus;
  generate test packets by selectively copying the data packets from the primary data plane based on one or more parameters of the data packets matching one or more access lists;
  execute, by the secondary data plane, network processing decisions on the test packets based on the one or more configuration changes;
  intentionally drop the test packets after executing the network processing decisions by the secondary data plane; and
  evaluate results of the network processing decisions executed by the secondary data plane on the test packets.

11. The apparatus of claim 10, wherein the at least one processor is further configured to determine whether to apply all, some, or none of the one or more configuration changes to the primary data plane based on the results of the network processing decisions on the test packets.

12. The apparatus of claim 10, wherein the at least one processor is further configured to synchronize configuration settings of the secondary control plane to configuration settings of the primary control plane before obtaining the one or more configuration changes.

13. The apparatus of claim 10, wherein the apparatus is a managed network element.

14. The apparatus of claim 10, wherein the primary data plane has a plurality of network interfaces including the network interface at which the data packets may be obtained or provided from the apparatus and the secondary data plane has a plurality of virtual interfaces including the virtual interface, wherein each virtual interface of the plurality of virtual interfaces is assigned an Internet Protocol address that differs from every Internet Protocol address assigned to the plurality of network interfaces of the primary data plane.

15. The apparatus of claim 10, wherein the at least one processor is configured to obtain the one or more configuration changes from a network controller.

16. One or more non-transitory computer readable storage media encoded with instructions to be executed by a processor in a network device that includes a primary control plane operable to program a primary data plane that processes data packets obtained at the network device to determine how or whether the data packets are to be directed into a network, and a secondary control plane operable to program a secondary data plane, wherein the secondary control plane is a software containerized version of the primary control plane, and the secondary data plane is a software containerized version of the primary data plane, and wherein a first Internet Protocol address assigned to a network interface of the primary data plane differs from a second Internet Protocol address assigned to a virtual interface of the secondary data plane, the first and second Internet Protocol addresses sharing a common subnetwork, wherein the instructions, when executed by the processor, cause the processor to:
  obtain, at the secondary control plane, one or more configuration changes to be made to the network device;
  generate test packets by selectively copying the data packets from the primary data plane based on one or more parameters of the data packets matching one or more access lists;
  execute, by the secondary data plane, network processing decisions on the test packets based on the one or more configuration changes;
  intentionally drop the test packets after executing the network processing decisions by the secondary data plane; and
  evaluate results of the network processing decisions executed by the secondary data plane on the test packets.

17. The one or more non-transitory computer readable storage media of claim 16, wherein the instructions further cause the processor to determine whether to apply all, some, or none of the one or more configuration changes to the primary data plane based on the results of the network processing decisions on the test packets.

18. The one or more non-transitory computer readable storage media of claim 16, wherein the instructions further cause the processor to synchronize configuration settings of the secondary control plane to configuration settings of the primary control plane before obtaining the one or more configuration changes.

19. The one or more non-transitory computer readable storage media of claim 16, wherein the network device is a managed network element.

20. The non-transitory computer readable storage media of claim 16, wherein the instructions cause the processor to obtain the one or more configuration changes from a network controller.

* * * * *